US012735102B2

(12) United States Patent
Yoon et al.

(10) Patent No.: US 12,735,102 B2
(45) Date of Patent: Sep. 15, 2026

(54) APPARATUS FOR CONTROLLING REAR WHEEL STEERING OF A VEHICLE AND A VEHICLE INCLUDING THE SAME

(71) Applicants: HYUNDAI MOTOR COMPANY, Seoul (KR); KIA CORPORATION, Seoul (KR); KOREA UNIVERSITY OF TECHNOLOGY AND EDUCATION INDUSTRY-UNIVERSITY COOPERATION FOUNDATION, Cheonan-si (KR)

(72) Inventors: Young Sik Yoon, Suwon-si (KR); Rae Wook Chung, Yongin-si (KR); Dong Hyun Hwang, Hwaseong-si (KR); Wan Ki Cho, Suwon-si (KR); Seung Han You, Seoul (KR)

(73) Assignees: HYUNDAI MOTOR COMPANY, Seoul (KR); KIA CORPORATION, Seoul (KR); KOREA UNIVERSITY OF TECHNOLOGY AND EDUCATION INDUSTRY-UNIVERSITY COOPERATION FOUNDATION, Cheonan-si (KR)

( * ) Notice: Subject to any disclaimer, the term of this patent is extended or adjusted under 35 U.S.C. 154(b) by 62 days.

(21) Appl. No.: 18/907,100

(22) Filed: Oct. 4, 2024

(65) Prior Publication Data

US 2025/0333109 A1 Oct. 30, 2025

(30) Foreign Application Priority Data

Apr. 30, 2024 (KR) ........................ 10-2024-0057512

(51) Int. Cl.
*B62D 12/02* (2006.01)
*B62D 6/00* (2006.01)

(52) U.S. Cl.
CPC ............ *B62D 12/02* (2013.01); *B62D 6/001* (2013.01); *B62D 6/002* (2013.01)

(58) Field of Classification Search
CPC ........ B62D 12/02; B62D 6/001; B62D 6/002; B62D 15/025; B62D 13/06; B62D 7/159; B62D 6/00; B62D 7/142; B60W 30/02; B60W 2050/0022; B60W 2510/10; B60W 2510/20; B60W 2520/14; B60W 2520/22; B60Y 2200/147
See application file for complete search history.

*Primary Examiner* — Long T Tran
*Assistant Examiner* — Charles J Brauch
(74) *Attorney, Agent, or Firm* — Lempia Summerfield Katz LLC

(57) ABSTRACT

An apparatus is for controlling rear wheel steering of a vehicle including a tractor and a trailer connected to each other. The apparatus includes a computing device having a processor and a storage medium on which one or more programs configured to be executable by the processor are recorded. The one or more programs include instructions for executing an operation of selecting a target rear wheel steering angle based on a minimum hitch angle between a tractor and a trailer and a sensed hitch angle value between the tractor and the trailer. The minimum hitch angle is not converged by a controllable front wheel steering angle and a controllable rear wheel steering angle of the tractor.

19 Claims, 15 Drawing Sheets

$$\gamma_{tar} = \textbf{Act\_reverse} \cdot w_{jackknife}\gamma_{tar.jackknife} + (1 - \textbf{Act\_reverse})\left(1 - w_{jackknife}\right)\gamma$$

| YAW RATE RELATIONAL EXPRESSION | $\gamma = \frac{v_x}{l_f + l_r}\left(tan\,\delta_f - tan\,\delta_r\right)$ |
|---|---|

APPARATUS FOR CONTROLLING REAR WHEEL STEERING OF A VEHICLE AND A VEHICLE INCLUDING THE SAME

CROSS-REFERENCE TO RELATED APPLICATION(S)

This application claims the benefit of and priority to Korean Patent Application No. 10-2024-0057512 filed on Apr. 30, 2024 in the Korean Intellectual Property Office, the disclosure of which is incorporated herein by reference in its entirety.

BACKGROUND

1. Field

The present disclosure relates to an apparatus for controlling rear wheel steering of a vehicle and to a vehicle including the same.

2. Description of Related Art

Recently, vehicles equipped with a rear wheel steering (RWS) control system for control stability have gradually increased, and research on the RWS control system has also been actively conducted. However, the related art RWS control system does not take into account a vehicle in which a trailer and a tractor are connected to each other.

SUMMARY

If a hitch angle between a trailer and a tractor of a vehicle exceeds a critical hitch angle, the vehicle may jackknife, making it impossible for the hitch angle to converge to 0 due to the maximum controllable front wheel steering angle and the maximum controllable rear wheel steering angle of a tractor. An aspect of the present disclosure is to provide an apparatus for controlling rear wheel steering of a vehicle capable of preventing a jackknife phenomenon and a vehicle including the same.

According to an aspect of the present disclosure, an apparatus for controlling rear wheel steering of a vehicle including a tractor and a trailer connected to each other is provided. The apparatus includes a computing device including a processor and a storage medium on which one or more programs configured to be executable by the processor are recorded. The one or more programs include instructions for executing an operation of selecting a target rear wheel steering angle based on a minimum hitch angle between the tractor and the trailer and a sensed hitch angle value between the tractor and the trailer. The minimum hitch angle between the tractor and the trailer is not converged by a controllable front wheel steering angle and a controllable rear wheel steering angle of the tractor.

According to another aspect of the present disclosure, an apparatus for controlling rear wheel steering of a vehicle including a tractor and a trailer connected to each other is provided. The apparatus includes a computing device including a processor and a storage medium on which one or more programs configured to be executable by the processor are recorded. The apparatus also includes a rear wheel steering (RWS) controller configured to control rear wheels of a tractor of the vehicle according to a predetermined control logic or a target rear wheel steering angle. The one or more programs for executing an operation of include instructions selecting the target rear wheel steering angle based on a sensed hitch angle value between the tractor and the trailer. The RWS controller controls the rear wheels of the tractor by increasing a control proportion of the target rear wheel steering angle compared to the predetermined control logic as the sensed hitch angle value increases.

According to another aspect of the present disclosure, a vehicle includes the computing device described above.

BRIEF DESCRIPTION OF DRAWINGS

The above and other aspects, features, and advantages of the present disclosure should be more clearly understood from the following detailed description, taken in conjunction with the accompanying drawings.

DETAILED DESCRIPTION

Figure 1:
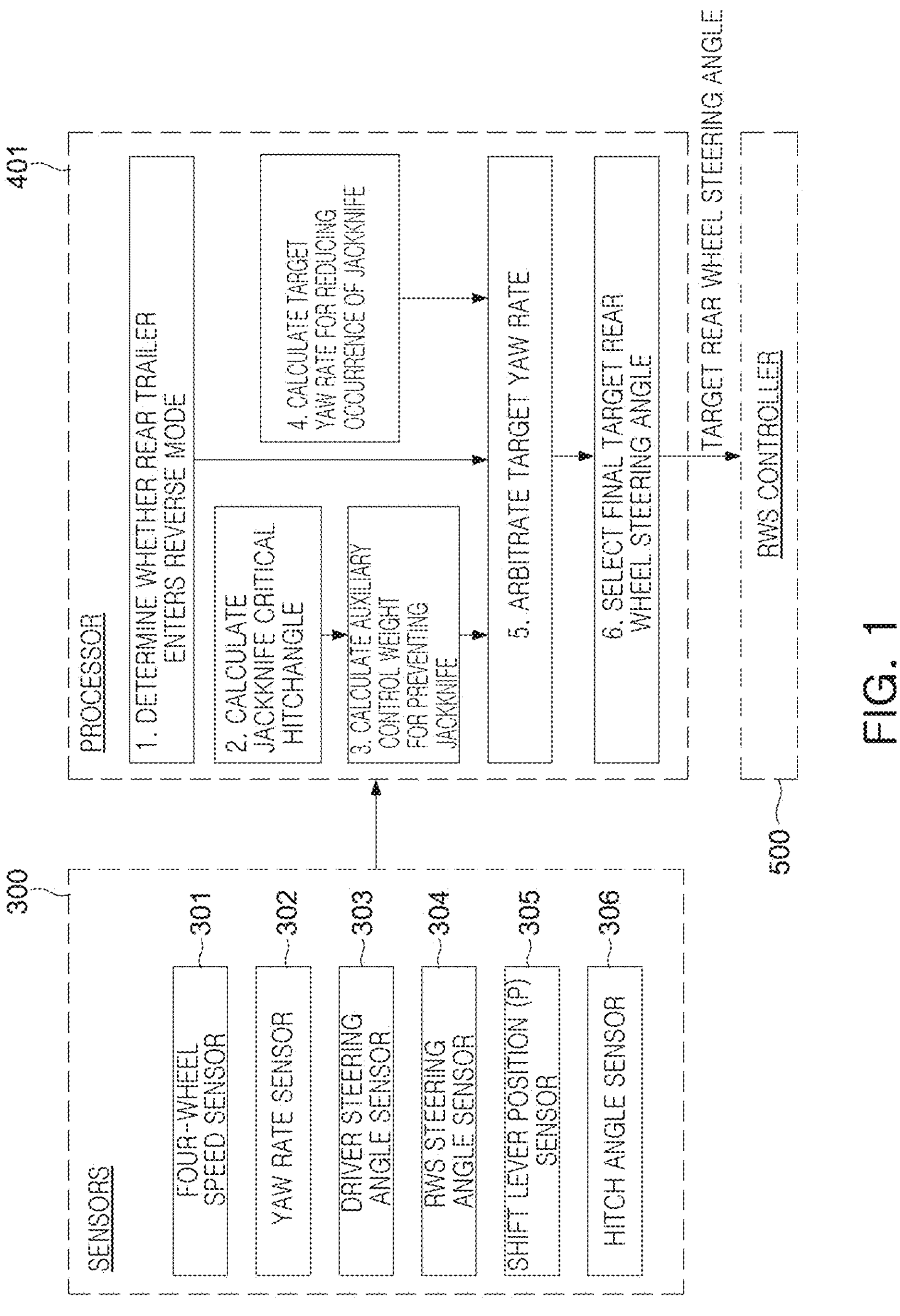
FIGS. 1 and 2 are diagrams illustrating an apparatus for controlling rear wheel steering of a vehicle and a vehicle including the same according to an embodiment of the present disclosure.

While embodiments of the present disclosure may be modified in various ways and take on various alternative forms, specific embodiments thereof are shown in the drawings and described in detail below. However, it should be understood that there is no intent to limit the present disclosure to the particular embodiments disclosed. On the contrary, the present disclosure covers all modifications, equivalents, and alternatives falling within the spirit and scope of the present disclosure.

It should be understood that, although the terms "first," "second," and the like may be used herein to describe various elements, these elements should not be limited by these terms. These terms are only used to distinguish one element from another. For example, a first element could be termed a second element, and a second element could similarly be termed a first element without departing from the scope of the present disclosure. As used herein, the term "and/or" may include any and all combinations of one or more of the associated listed items.

The terms used herein to describe embodiments of the present disclosure are not intended to limit the scope of the present disclosure. The articles "a," and "an" are singular in that they have a single referent. However, the use of the singular form in the present document should not preclude the presence of more than one referent. In other words, elements of the present disclosure referred to in the singular may number one or more, unless the context clearly indicates otherwise. It should be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

Unless defined in a different way, all the terms used herein including technical and scientific terms have the same meanings as understood by those having ordinary skill in the art to which the present disclosure pertains. Such terms as defined in generally used dictionaries should be construed to have the same meanings as those of the contexts of the related art, and unless clearly defined in the application, they should not be construed to have ideally or excessively formal meanings.

In this specification, vehicles (including electric vehicles) refer to various vehicles that move transported objects, such as people, animals, or goods, from a starting point to a destination. These vehicles are not limited to vehicles that run on roads or tracks.

When a component, controller, processor, device, element, unit, member, apparatus, or the like of the present disclosure is described as having a purpose or performing an operation, function, or the like, the component, controller, processor, device, element, unit, member, apparatus should be considered herein as being "configured to" meet that purpose or to perform that operation or function.

In the present disclosure, each of phrases such as "A or B", "at least one of A and B", "at least one of A or B", "A, B or C", "at least one of A, B and C", "at least one of A, B or C" and "at least one of A, B, or C, or a combination thereof" may include any one or all possible listed together in the combinations of the items corresponding one of the phrases.

Hereinafter, embodiments of the present disclosure are described in more detail with reference to the accompanying drawings.

Figure 2:
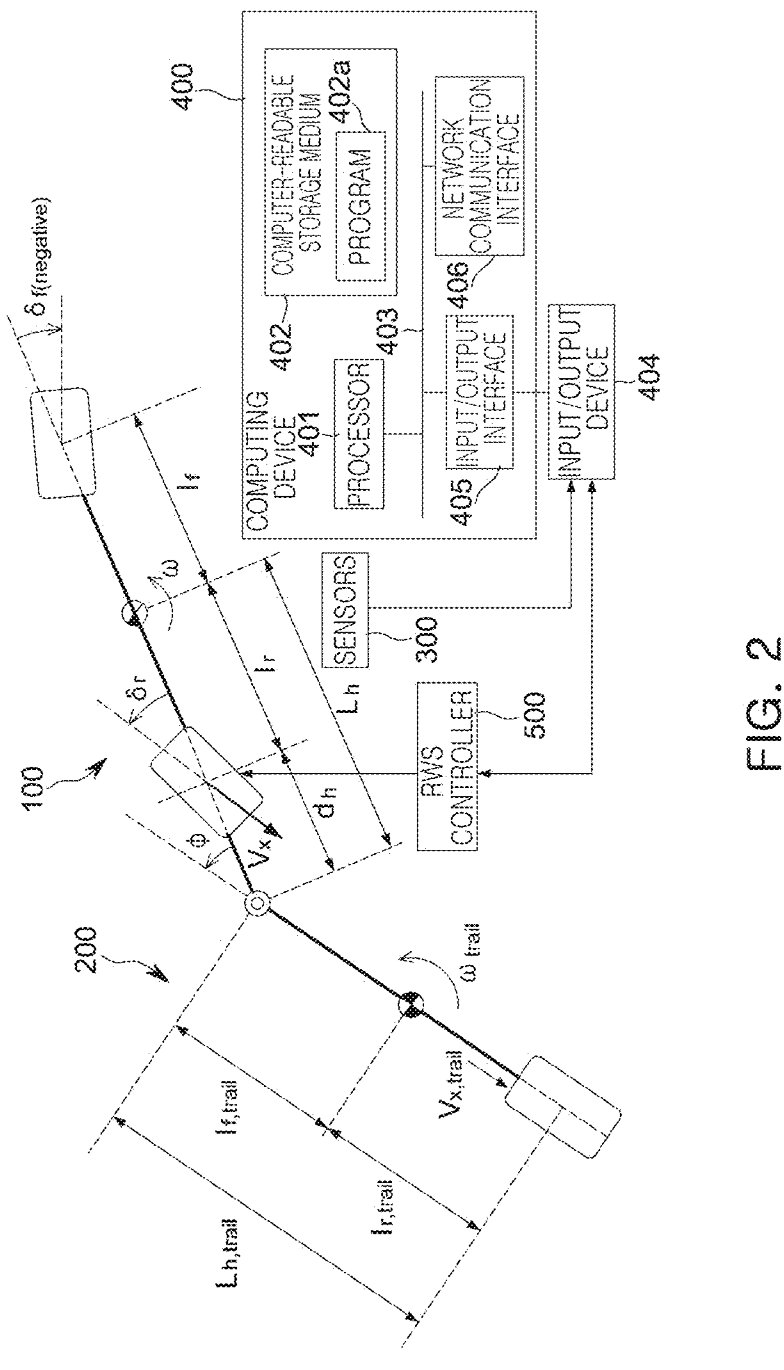

Referring to FIGS. 1 and 2, an apparatus for controlling rear wheel steering of a vehicle according to an embodiment of the present disclosure may include at least one of a computing device 400, sensors 300, or a rear wheel steering (RWS) controller 500. At least one of the computing device 400, the sensors 300, or the RWS controller 500 may be included in a vehicle. RWS is an abbreviation for rear wheel steering.

The vehicle may include a tractor 100 and a trailer 200. The tractor 100 may include at least one of the computing device 400, the sensors 300, or the RWS controller 500. The tractor 100 and the trailer 200 may be physically connected to or separated from each other through user operation. For example, the tractor 100 and the trailer 200 may be connected to each other by a connecting rod. Whether the connecting rod is connected may be switched by a user operation. The tractor 100 may generate traveling power to rotate wheels thereof and steering force to control directions of the wheels. The trailer 200 may move depending on the traveling power and steering force generated by the tractor 100. The tractor 100 may be connected to the trailer 200 to travel or may be separated from the trailer 200 to travel.

A yaw rate $\omega$ of the tractor 100 may be controlled by controlling a front wheel steering angle $\delta_f$ and rear wheel steering angle $\delta_r$. The yaw rate $\omega$ of the tractor 100 may be affected by a speed value $v_x$ and/or a length value of the tractor 100. The length value may include at least one of a distance $l_f+l_r$ between a front wheel and a rear wheel of the tractor 100, a distance $d_h$ between the rear wheel of the tractor 100 and a connecting rod, or a distance $L_h$ between the center of the tractor 100 and the connecting rod.

A hitch angle $\Phi$ between the tractor 100 and the trailer 200 may be controlled by controlling the yaw rate $\omega$ of the tractor 100 and may affect a yaw rate $\omega_{trail}$ of the trailer 200. The yaw rate $\omega_{trail}$ may be affected by a speed value $V_{x,trail}$ and/or a length value of the trailer 200. The length value may include at least one of a distance $l_{h,trail}$ between a rear wheel of the trailer 200 and the connecting rod, a distance $l_{r,trail}$ between the center of the trailer 200 and the rear wheel, or a distance $l_{f,trail}$ between the center of the trailer 200 and the connecting rod.

The sensors 300 may include at least one of a four-wheel speed sensor 301, a yaw rate sensor 302, a driver steering angle sensor 303, an RWS steering angle sensor 304, a shift lever position (P) sensor 305, or a hitch angle sensor 306. The four-wheel speed sensor 301 may sense the wheel speeds of four wheels. The yaw rate sensor 302 may a horizontal rotation of the vehicle. The driver steering angle sensor 303 may sense a driver's rotation of a steering wheel. The RWS steering angle sensor 304 may sense the rear wheel steering angle $\delta_r$ of the tractor 100. The shift lever position (P) sensor 305 may sense moving of a shift lever to a specific position by the driver. The hitch angle sensor 306 may sense a hitch angle between the tractor 100 and the trailer 200 and output a sensed hitch angle $\Phi$ value.

A processor 401 of the computing device 400 may include, as logic blocks, at least one of a rear trailer reverse mode entry determination unit 1, a jackknife critical hitch angle calculation unit 2, a jackknife prevention auxiliary control weight calculation unit 3, a target yaw rate calculation unit 4 for reducing the occurrence of jackknife, a target yaw rate arbitration unit 5, or a final target rear wheel steering angle selection unit 6. The processor 401 of the computing device 400 may generate a target rear wheel steering angle value.

The RWS controller 500 may receive a target rear wheel steering angle value from the processor 401 and actively control the rear wheels of the tractor 100 according to a predetermined control logic or the target rear wheel steering angle value. The RWS controller 500 may drive the steering of the rear wheels of the tractor 100 by outputting steering force corresponding to the target rear wheel steering angle value of the tractor 100. The RWS controller 500 may control the rear wheels of the tractor 100 without the driver's steering control input. However, depending on the design (and/or change to manual mode), the RWS controller 500 may additionally receive a steering control input and control the rear wheels according to the steering control input preferentially over the predetermined control logic and the target rear wheel steering angle.

For example, the predetermined control logic may be a control logic configured to control the rear wheels of the tractor 100 based on control variables of the tractor 100, substantially unrelated to the trailer 200. For example, the predetermined control logic may be a control logic configured to improve parking stability (e.g., accident prevention) and/or parking efficiency (e.g., minimizing travel distance) of the tractor 100 when parking the tractor 100. For example, the predetermined control logic is be a control logic configured to steer the rear wheels in the same direction as a front wheel steering direction when a traveling speed of the tractor 100 is high and to steer the rear wheels in a direction opposite to the front wheel steering direction when the traveling speed of the tractor 100 is low.

Since the predetermined control logic is likely to be configured without substantially considering the trailer 200, if the rear wheels of the tractor 100 are controlled only by the predetermined control logic, a phenomenon (jackknife phenomenon) in which the sensing hitch angle $\Phi$ exceeds a minimum hitch angle ($\Phi_{critical}$ in FIG. 4) between the tractor 100 and the trailer 200 that does not converge by the controllable front wheel steering angle $\delta_f$ and the controllable rear wheel steering angle $\delta_r$ of the tractor 100.

Figure 4:
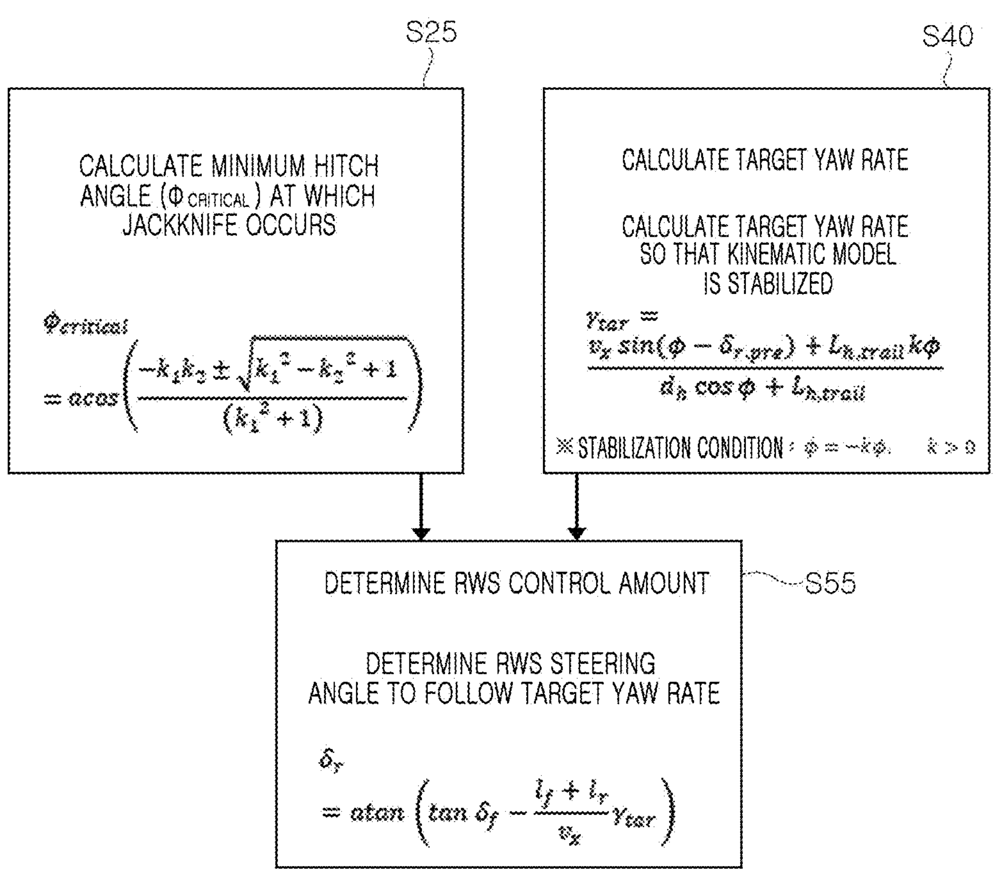

Referring to FIGS. 2 and 4, the computing device 400 of the apparatus for controlling rear wheel steering of a vehicle according to an embodiment of the present disclosure may set the target rear wheel steering angle $\delta_r$ based on the minimum hitch angle $\Phi_{critical}$ and the sensed hitch angle value $\Phi$. Alternatively, the computing device 400 may select the target rear wheel steering angle $\delta_r$ based on the sensed hitch angle value $\Phi$, and the RWS controller 500 may control the rear wheels of the tractor 100 by increasing a control proportion of the target rear wheel steering angle $\delta_r$ compared to the predetermined control logic as the sensed hitch angle value $\Phi$ increases. Accordingly, the apparatus for controlling rear wheel steering of a vehicle according to an embodiment of the present disclosure may stably prevent the jackknife phenomenon of the tractor 100 and the trailer 200. Alternatively, the apparatus for controlling rear wheel steering of a vehicle may improve jackknife prevention, while stably using the predetermined control logic of the RWS controller 500, which is configured by considering the tractor 100 intensively.

Figure 3:
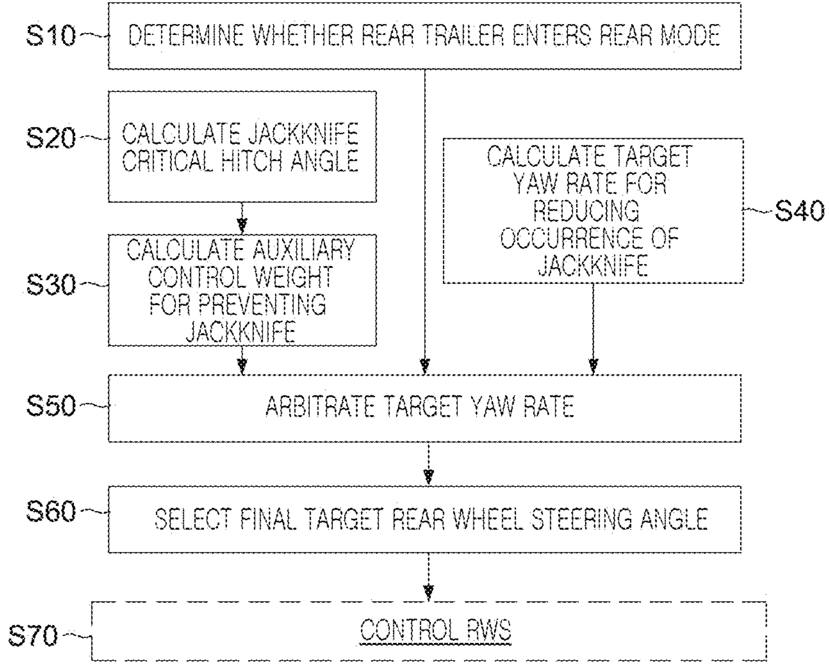
FIGS. 3 and 4 are flowcharts illustrating an operation performed by a computing device included in an apparatus for controlling rear wheel steering of a vehicle and a vehicle including the same according to an embodiment of the present disclosure.

Referring to FIG. 3, the apparatus for controlling rear wheel steering of a vehicle according to an embodiment of the present disclosure may execute at least one of an operation (S10) of determining, by the computing device (400 in FIG. 2), whether the rear trailer enters a reverse mode, an operation (S20) of calculating a jackknife critical hitch angle (a minimum hitch angle), an operation (S30) of calculating a jackknife prevention auxiliary control weight, an operation (S40) of calculating a target yaw rate for reducing the occurrence of jackknife, an operation (S50) of arbitrating a target yaw rate, or an operation (S60) of selecting a final target rear wheel steering angle. Thereafter, the RWS controller 500 may perform RWS control (S70).

Referring to FIG. 4, the apparatus for controlling rear wheel steering of a vehicle according to an embodiment of the present disclosure may execute at least one of an operation (S25) of calculating, by the computing device (400 in FIG. 2), the minimum hitch angle $\Phi_{critical}$ at which jackknife occurs, the operation (S40) of calculating the target yaw rate $\Gamma_{tar}$ so that a kinematic hitch angle model is stabilized, or an operation (S55) of determining the target rear wheel steering angle $\delta_r$ to follow the target yaw rate $\Gamma_{tar}$.

Figure 5:
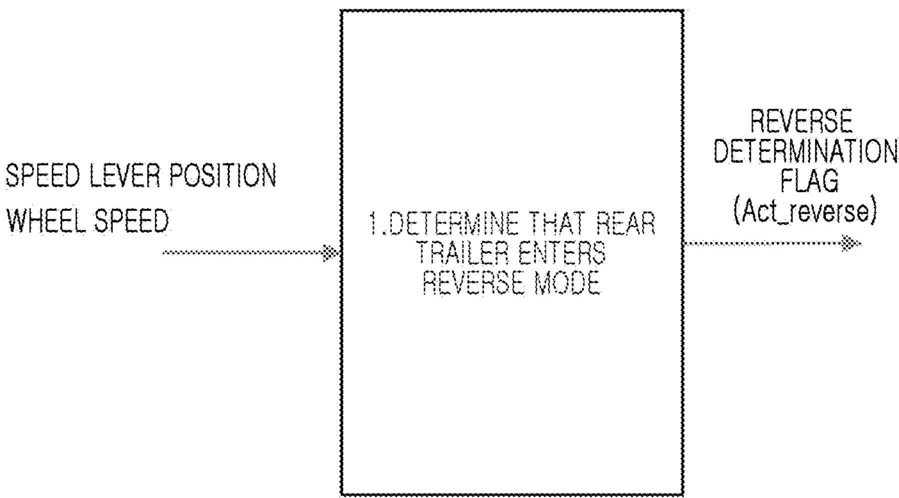
FIG. 5 is a diagram illustrating an operation of determining whether a vehicle including an apparatus for controlling rear wheel steering of a vehicle moves backwards according to an embodiment of the present disclosure.

Referring to FIGS. 1, 3, and 5, the apparatus for controlling rear wheel steering of a vehicle according to an embodiment of the present disclosure may execute the operation (S10) of determining, by the rear trailer reverse mode entry determination unit 1 of the computing device (400 in FIG. 2), whether the rear trailer enters the reverse mode. For example, the operation (S10) of determining whether the rear trailer enters the reverse mode may include whether the vehicle moves backwards (i.e., whether the vehicle moves in reverse) based on a value sensed by the shift lever position sensor 305 and a value (wheel speed) sensed by the four-wheel speed sensor 301.

The shift lever position (P) sensor 305 may sense that the driver changes the shift lever position to an R gear. The rear trailer reverse mode entry determination unit 1 may assign 1 to R when the shift lever is located in the R gear. The four-wheel speed sensor 301 may sense a wheel speed of each of the front and rear wheels. The rear trailer reverse mode entry determination unit 1 may assign 1 to a rear situation value Act_reverse when the product of an average of the sensing values of the four-wheel speed sensor 301 and R is a certain value (e.g., 1 kph) or greater. Otherwise, the rear trailer reverse mode entry determination unit 1 may assign 0 to the reverse situation value Act_reverse.

When the vehicle does not move backwards, the RWS controller 500 may control the rear wheels of the tractor 100 according to the predetermined control logic. When the vehicle moves backwards, the RWS controller 500 may control the rear wheels of the tractor 100 based on at least one of the target rear wheel steering angle or the predetermined control logic. For example, the RWS controller 500 may perform switching between the predetermined control logic and the target rear wheel steering angle using the reverse situation value Act_reverse.

Figure 6:
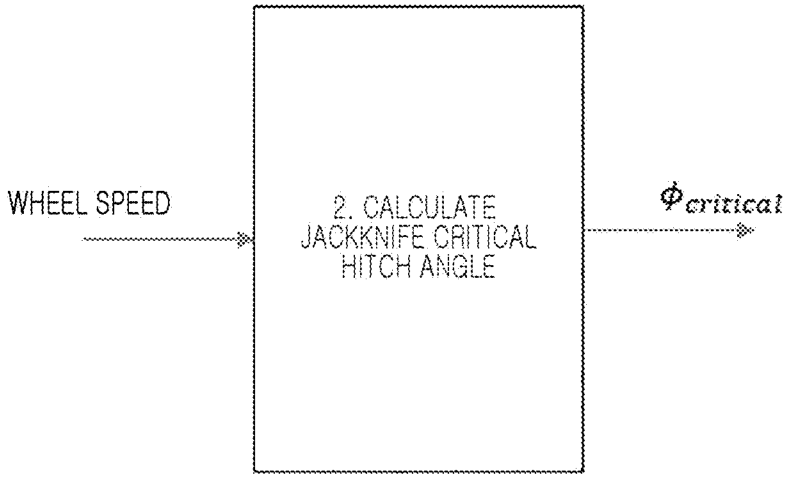
FIG. 6 is a diagram illustrating an operation of calculating a jackknife critical hitch angle that may be used by an apparatus for controlling rear wheel steering of a vehicle and a vehicle including the same according to an embodiment of the present disclosure.

Referring to FIGS. 1, 3, and 6, the apparatus for controlling rear wheel steering of a vehicle according to an embodiment of the present disclosure may perform the operation (S20) of calculating a jackknife critical hitch angle (a minimum hitch angle) by the jackknife critical hitch angle calculation unit 2 of the computing device (400 in FIG. 2). The apparatus may use Equation 1 below but is not limited thereto. The operation S20 may be included in the operation of selecting the target rear wheel steering angle.

[Equation 1]

$$\dot{\phi} = \frac{v_x}{L_{h,trail}}\sin(\phi - \delta_r) - \frac{\gamma d_h}{L_{h,trail}}\cos\phi - \gamma = \frac{v_x}{L_{h,trail}}(\sin\phi\cos\delta_r - \sin\delta_r\cos\phi) - \frac{d_h}{L_{h,trail}}\frac{v_x}{l_f + l_r}(\tan\delta_f - \tan\delta_r)\cos\phi - \frac{v_x}{l_f + l_r}(\tan\delta_f - \tan\delta_r)$$

$$\dot{\phi} = f(\phi, \delta_{f.max}, \delta_{r.max}, v_x) = -k\phi,\ k > 0$$

$$\phi_{critical} = a\cos\left(\frac{-k_1 k_2 \pm \sqrt{k_1^2 - k_2^2 + 1}}{(k_1^2 + 1)}\right)$$

$$k_1 = \tan\delta_{r.max} + \frac{d_h(\tan\delta_{f.max} - \tan\delta_{r.max})}{(l_f + l_r)\cos\delta_{r.max}}$$

$$k_2 = \frac{1}{l_f + l_r}\frac{L_{h,trail}}{\cos\delta_{r.max}}(\tan\delta_{f.max} - \tan\delta_{r.max})$$

Equation 1 may be derived by a kinematic hitch angle model. The left side of Equation 1 may include a differential value of the hitch angle value $\Phi$. The right side of Equation 1 may include a function f in which the hitch angle value $\Phi$, the front wheel steering angle $\delta_f$, the rear wheel steering angle $\delta_r$, and the speed value $v_x$ of the tractor are variables. The yaw rate value $\Gamma$ of the tractor 100 may be replaced by a function of the front wheel steering angle $\delta_f$, the rear wheel steering angle $\delta_r$, and the speed value $v_x$ of the tractor. The distance $l_{h,trail}$ between the rear wheel of the trailer 200 and the connecting rod, the distance $d_h$ between the rear wheel of the tractor 100 and the connecting rod, and the distance $l_f+l_r$ between the front wheel and the rear wheel of the tractor 100 may be constants.

Since the left side of Equation 1 is a differential value of the hitch angle value $\Phi$, the fact that the function f of the hitch angle value $\Phi$ is less than 0 means that the hitch angle value $\Phi$ converges. The fact that the function f of the hitch angle value $\Phi$ is greater than 0 may mean that the hitch angle value $\Phi$ diverges. The right side of Equation 1 may be summarized as $-k\Phi$. The fact that k is greater than 0 may mean that the hitch angle value $\Phi$ converges. In other words, $k\Phi$ may correspond to the differential value of the hitch angle value $\Phi$, which makes the kinematic hitch angle model a stable system.

The right side of Equation 1 may be lowered as the front wheel steering angle $\delta_f$ and the rear wheel steering angle $\delta_r$ increase. Therefore, if k in the case of the maximum controllable front wheel steering angle $\delta_{f.max}$ and the maximum controllable rear wheel steering angle $\delta_{r.max}$ is 0, the hitch angle value $\Phi$ may converge by controlling the front wheel steering angle $\delta_f$ and the rear wheel steering angle $\delta_r$, and the jackknife phenomenon may not occur. Therefore, the critical (minimum) hitch angle $\Phi_{critical}$ at the time of the maximum controllable front wheel steering angle $\delta_{f.max}$ and the maximum controllable rear wheel steering angle $\delta_{r.max}$ may be calculated under the condition that the function f is 0.

For example, in the operation (S30) of calculating a weight, the weight may be calculated based on the minimum hitch angle $\Phi_{critical}$ according to Equation 2 below. In Equations 2, k1 and k2 may be constants determined based on the maximum controllable front wheel steering angle $\delta_{f.max}$ and the maximum controllable rear wheel steering angle $\delta_{r.max}$, respectively. The distance $l_{h,trail}$ between the rear wheel of the trailer 200 and the connecting rod, the distance $d_h$ between the rear wheel of the tractor 100 and the connecting rod, and the distance $l_f+l_r$ between the front wheel and the rear wheel of the tractor 100 may be constants. In Equation 2, a cos refers to arc cos function.

$$\phi_{critical} = a\cos\left(\frac{-k_1 k_2 \pm \sqrt{k_1^2 - k_2^2 + 1}}{\left(k_1^2 + 1\right)}\right) \quad \text{[Equation 2]}$$

Figure 7:
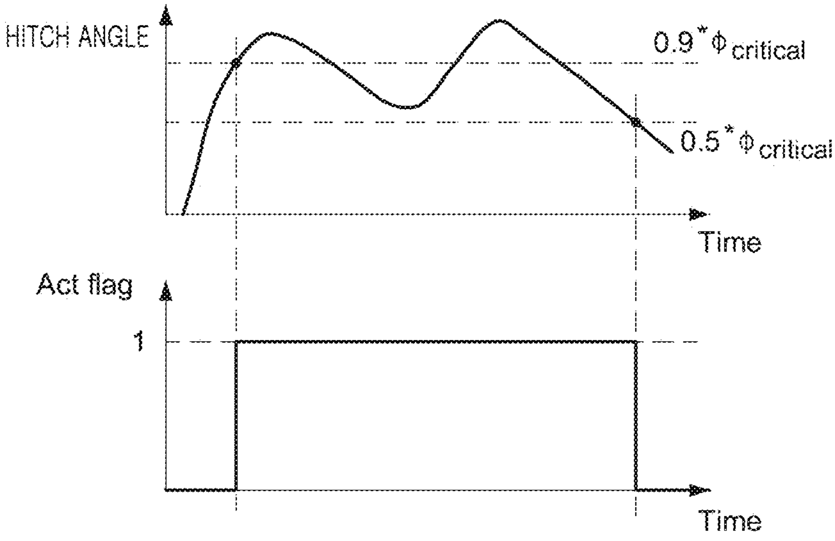
FIG. 7 is a graph illustrating weights that may be used by an apparatus for controlling rear wheel steering of a vehicle and a vehicle including the same according to an embodiment of the present disclosure.
Figure 7:
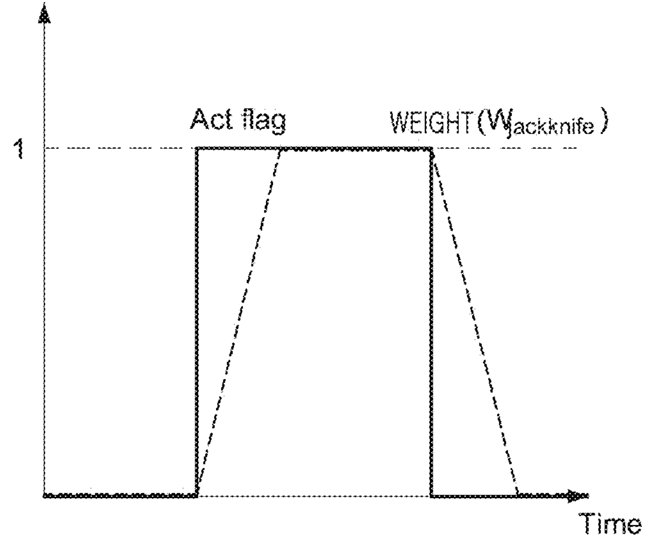
Figure 8:
FIG. 8 is a diagram illustrating a process of calculating a jackknife prevention yaw rate that may be used by an apparatus for controlling rear wheel steering of a vehicle and a vehicle including the same according to an embodiment of the present disclosure.
Figure 8:
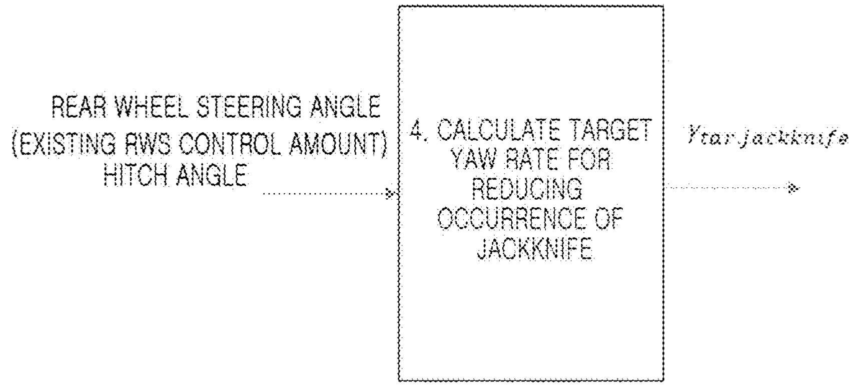
Figure 8:
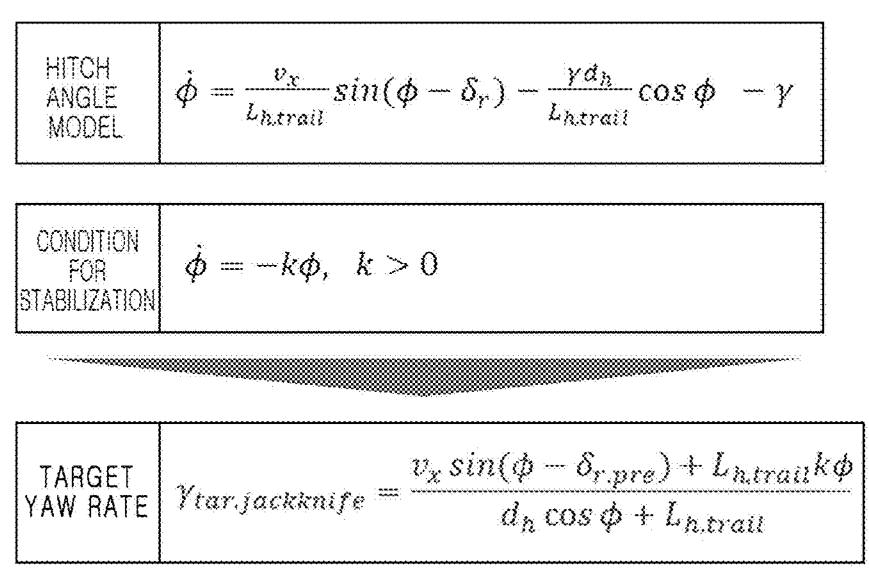

Referring to FIGS. 1, 3, and 7, the apparatus for controlling rear wheel steering of a vehicle according to an embodiment of the present disclosure may execute the operation (S30) of calculating a weight $W_{jackknife}$ based on the minimum hitch angle $\Phi_{critical}$ and the sensed hitch angle value $\Phi$ by the jackknife prevention auxiliary control weight calculation unit 3 of the computing device (400 in FIG. 2). The operation S30 may be included in the operation of selecting the target rear wheel steering angle.

The weight $W_{jackknife}$ may be a value indicating how much the RWS controller 500 will increase the control proportion of the target rear wheel steering angle or compared to the predetermined control logic. Therefore, $\delta_r$ the weight $W_{jackknife}$ is larger, the RWS controller 500 may control the rear wheels of the tractor 100 by increasing the control proportion of the target rear wheel steering angle compared to the predetermined control logic. Thus, the RWS controller 500 may control the rear wheel steering angle $\delta_r$ with greater focus on preventing jackknife as the weight $W_{jackknife}$ is larger, and may control the rear wheel steering angle $\delta_r$ with greater focus on the predetermined control logic as the weight $W_{jackknife}$ is smaller. A value obtained by subtracting the weight $W_{jackknife}$ from 1 may be a weight applied to the predetermined control logic.

Compared to the predetermined control logic, the target rear wheel steering angle may be a value selected with greater focus on preventing jackknife. A greater sensed hitch angle value may indicate a higher possibility of the occurrence of jackknife. Accordingly, the operation (S30) of calculating the weight $W_{jackknife}$ may include calculating a weight increasing as a relative value of the sensed hitch angle value to the minimum hitch angle $\Phi_{critical}$ increases. For example, the relative value may be a value obtained by dividing the minimum hitch angle $\Phi_{critical}$ by the sensed hitch angle value.

For example, the computing device (400 in FIG. 2) may change a control selection value Act flag from 0 to 1 when the sensed hitch angle value changes from less than 90% to more than 90% of the minimum hitch angle $\Phi_{critical}$. The computing device (400 in FIG. 2) may also change the control selection value Act flag from 1 to 0 when the sensed hitch angle value changes from more than 50% to 50% or less of the minimum hitch angle $\Phi_{critical}$. The 90% and 50% may vary depending on the design.

For example, the computing device (400 in FIG. 2) may linearly increase the weight $W_{jackknife}$ immediately after the control selection value Act flag changes from 0 to 1 and may linearly decrease the weight $W_{jackknife}$ immediately after the control selection value Act flag changes from 1 to 0. Accordingly, the apparatus for controlling rear wheel steering of a vehicle according to an embodiment of the present disclosure may stably switch between the predetermined control logic and control for preventing the jackknife phenomenon. For example, the computing device (400 in FIG. 2) may linearly increase or decrease the weight $W_{jackknife}$ using a rate limiter.

Referring to FIGS. 1, 3, 8, and 9, the apparatus for controlling rear wheel steering of a vehicle according to an embodiment of the present disclosure may execute the operation (S40) of calculating the target yaw rate $\Gamma_{tar}$ based on the sensed hitch angle value $\Phi$ by the target yaw rate calculation unit 4 for reducing the occurrence of jackknife of the computing device (400 in FIG. 2). The hitch angle model of FIG. 8 may correspond to the top-level equation of FIG. 6. A condition for the hitch angle value $\Phi$ to converge may include that k is higher than 0. The target yaw rate $\Gamma_{tar}$ may correspond to the minimum condition under which the hitch angle value $\Phi$ converges.

For example, the operation (S40) of calculating the target yaw rate $\Gamma_{tar}$ may include calculating a jackknife prevention yaw rate $\Gamma_{tar.jackknife}$ or the target yaw rate based on the sensed hitch angle value $\Phi$ and the speed value $v_x$ of the tractor. For example, the operation (S40) of calculating the target yaw rate $\Gamma_{tar}$ (S40) may include calculating the jackknife prevention yaw rate $\Gamma_{tar.jackknife}$ or the target yaw rate using the length value of the trailer 200. The length value of the trailer 200 may include the distance $l_{h,trail}$ between the rear wheel of the trailer 200 and the connecting rod and/or the distance $d_h$ between the rear wheel of the tractor 100 and the connecting rod.

For example, in the operation S40 of calculating the target yaw rate $\Gamma_{tar}$, a jackknife prevention yaw rate $\Gamma_{tar.jackknife}$ following Equation 3 below may be calculated. In Equation 3, $\delta_{r.pre}$ is a rear wheel steering angle value sensed by the RWS steering angle sensor 304.

$$\gamma_{tar.jackknife} = \frac{v_x \sin(\phi - \delta_{r.pre}) + L_{h,trail} k \phi}{d_h \cos\phi + L_{h,trail}} \quad \text{[Equation 3]}$$

Figure 9:
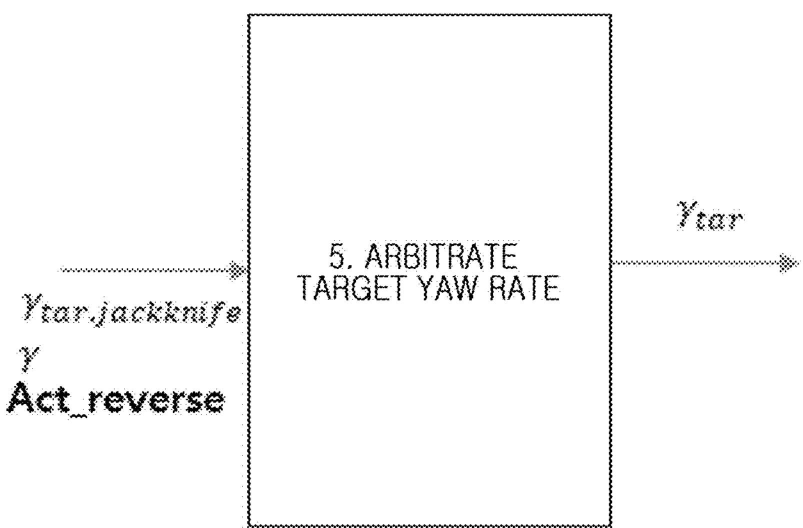
FIG. 9 is a diagram illustrating calculating a target yaw rate by applying a weight to a jackknife prevention yaw rate of an apparatus for controlling rear wheel steering of a vehicle and a vehicle including the same according to an embodiment of the present disclosure.

Referring to FIGS. 1, 3, and 9, the apparatus for controlling rear wheel steering of a vehicle according to an embodiment of the present disclosure may execute the operation (S50) of arbitrating a target yaw rate by the target yaw rate arbitration unit 5 of the computing device (400 in FIG. 2). The operation (S50) may be included in the operation of selecting the target rear wheel steering angle.

The operation (S50) of arbitrating the target yaw rate may include calculating the target yaw rate $\Gamma_{tar}$ by applying the weight $W_{jackknife}$ to the jackknife prevention yaw rate $\Gamma_{tar.jackknife}$. For example, the target yaw rate $\Gamma_{tar}$ may include the product of the reverse situation value Act_reverse, the weight $W_{jackknife}$, and the jackknife prevention yaw rate $\Gamma_{tar.jackknife}$. For example, the target yaw rate $\Gamma_{tar}$ may include the product of a value obtained by subtracting the reverse situation value Act_reverse from 1, a value obtained by subtracting the weight $W_{jackknife}$ from 1, and the yaw rate value $\Gamma$ according to the predetermined control logic. Since reverse situation value the Act_reverse is multiplied by the target yaw rate $\Gamma_{tar}$ calculation, the operation of selecting the target rear wheel steering angle may be performed only when the vehicle moves backwards.

Figure 10:
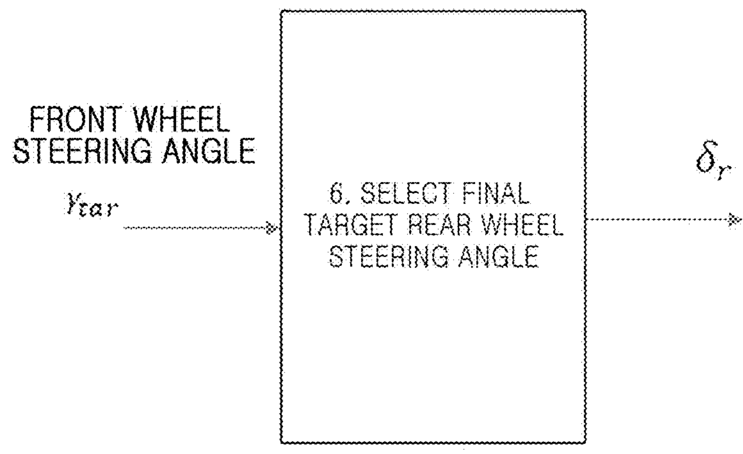
FIG. 10 is a diagram illustrating selection of a target rear wheel steering angle based on a target yaw rate that may be used by an apparatus for controlling rear wheel steering of a vehicle and a vehicle including the same according to an embodiment of the present disclosure.
Figure 10:
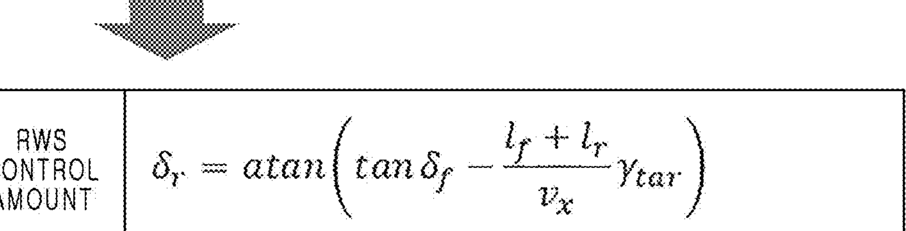

Referring to FIGS. 1, 3, and 10, the apparatus for controlling rear wheel steering of a vehicle according to an embodiment of the present disclosure may perform the operation (S60) of selecting the target rear wheel steering angle $\delta_r$ by the final target rear wheel steering angle selection unit 6 of the computing device (400 in FIG. 2).

For example, the operation S60 of selecting the target rear wheel steering angle $\delta_r$ may include selecting the target rear wheel steering angle $\delta_r$ based on the target yaw rate $\Gamma_{tar}$, the speed value $v_x$, and the front wheel steering angle $\delta_f$ value of the tractor 100.

For example, the operation (S60) of selecting the target rear wheel steering angle $\delta_r$ may further include selecting the target rear wheel steering angle $\delta_r$ using the length value of the tractor 100. The length value of the tractor 100 may include the distance $l_f+l_r$ between the front and rear wheels of the tractor 100.

For example, the operation (S60) of selecting the target rear wheel steering angle $\delta_r$ may select the target rear wheel steering angle $\delta_r$ according to Equation 4 below. In Equation 4, a tan refers to arc tan function. Depending on the design, the target yaw rate $\Gamma_{tar}$ may be replaced by the jackknife prevention yaw rate $\Gamma_{tar.jackknife}$, and the jackknife prevention yaw rate $\Gamma_{tar.jackknife}$ may correspond to the target yaw rate $\Gamma_{tar}$.

$$\delta_r = a\tan\left(\tan\delta_f - \frac{l_f + l_r}{v_x}\gamma_{tar}\right) \quad \text{[Equation 4]}$$

Figure 11A:
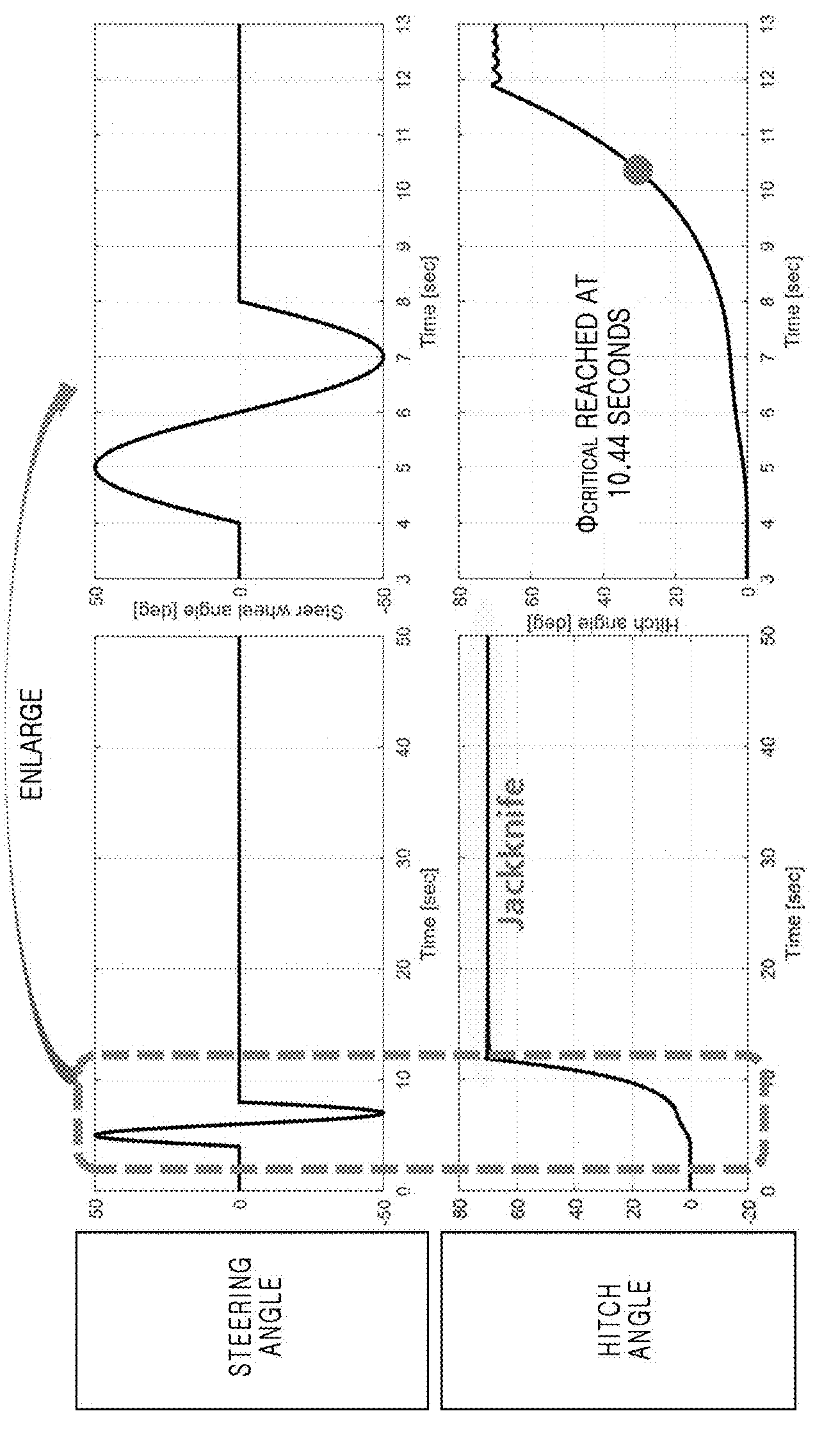
FIGS. 11A-13B are diagrams illustrating simulation results of an apparatus for controlling rear wheel steering of a vehicle and a vehicle including the same according to an embodiment of the present disclosure.

The upper graph of FIG. 11A illustrates a simulation of controlling the front wheel steering angle of the vehicle moving backwards at a speed of −5 kph according to a sin waveform (peak value: 50 degrees, period: 8 seconds). In the simulation, the lower graph of FIG. 11A illustrates that the hitch angle value $\Phi$ between the tractor and the trailer reaches the minimum hitch angle $\Phi_{critical}$ at which jackknife occurs at 10.44 seconds. In the simulation, the minimum hitch angle $\Phi_{critical}$ of the vehicle may be calculated to be about 32 degrees by the apparatus for controlling rear wheel steering of a vehicle and the vehicle including the same according to an embodiment of the present disclosure.

Figure 11B:
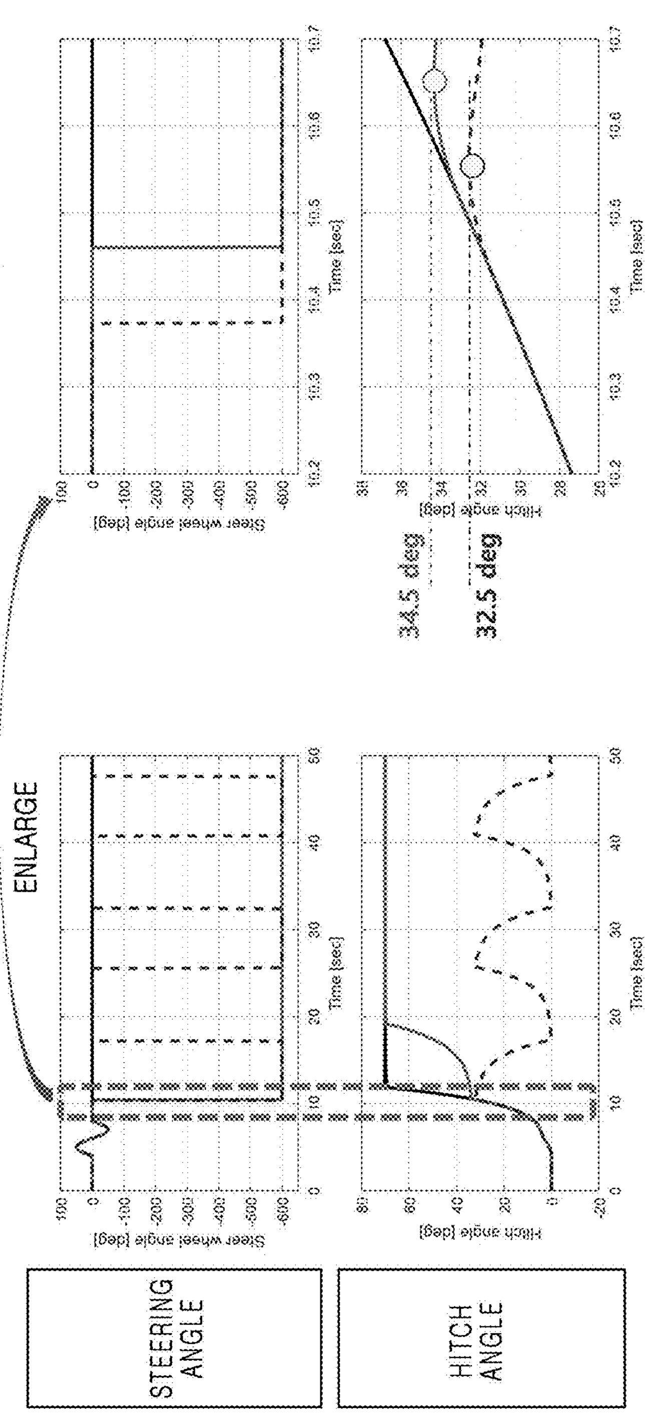

In the above simulation, the solid line in the graph of FIG. 11B indicates a situation in which the driver does not control the steering angle even if the current hitch angle value $\Phi$ reaches the minimum hitch angle $\Phi_{critical}$ or a situation in which the driver steers to the maximum steering angle when the current hitch angle value $\Phi$ is greater (e.g., 34.5 degrees) than the calculated minimum hitch angle $\Phi_{critical}$. The solid line in the graph of FIG. 11B also indicates that the hitch angle value $\Phi$ fails to converge, resulting in a jackknife phenomenon. In the simulation, the dotted line in the graph of FIG. 11B indicates a situation in which the driver steers to the maximum steering angle when the current hitch angle value $\Phi$ is below (e.g., 32.5 degrees) the minimum hitch angle $\Phi_{critical}$. The dotted line in the graph of FIG. 11B also indicates that the hitch angle value $\Phi$ converges so the jackknife phenomenon is prevented. In other words, the reliability of the minimum hitch angle $\Phi_{critical}$ calculated by the apparatus for controlling rear wheel steering of a vehicle and the vehicle including the same according to an embodiment of the present disclosure may increase.

Figure 12:
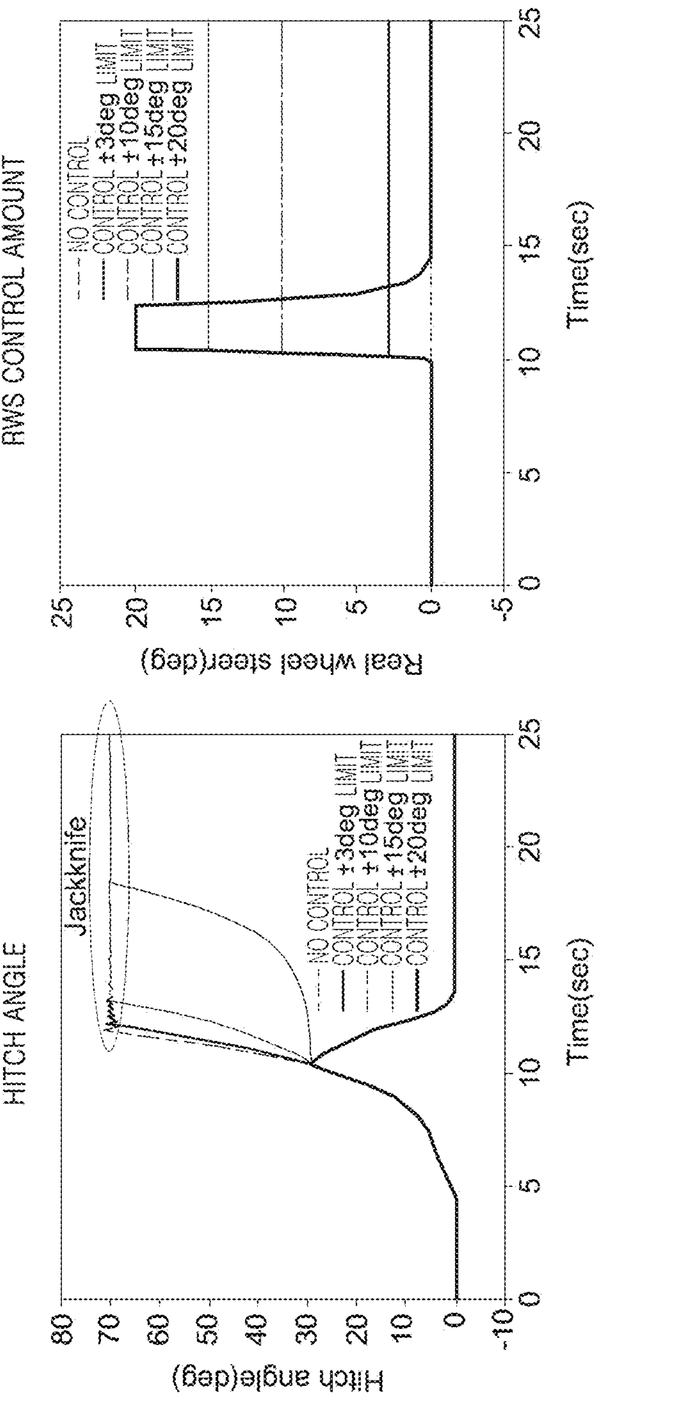

In the above simulation, FIG. 12 illustrates whether the hitch angle value $\Phi$ converges according to the controllable rear wheel steering angles (0 degrees, 3 degrees, 10 degrees, 15 degrees, 20 degrees) of the tractor. A rear wheel control point is a point (e.g., 10.44 seconds) at which the current hitch angle value $\Phi$ reaches the calculated minimum hitch angle $\Phi_{critical}$. The hitch angle value $\Phi$ cannot converge when the controllable rear wheel steering angle is 15 degrees or less, and may converge when the controllable rear wheel steering angle is 20 degrees or more.

Figure 13A:
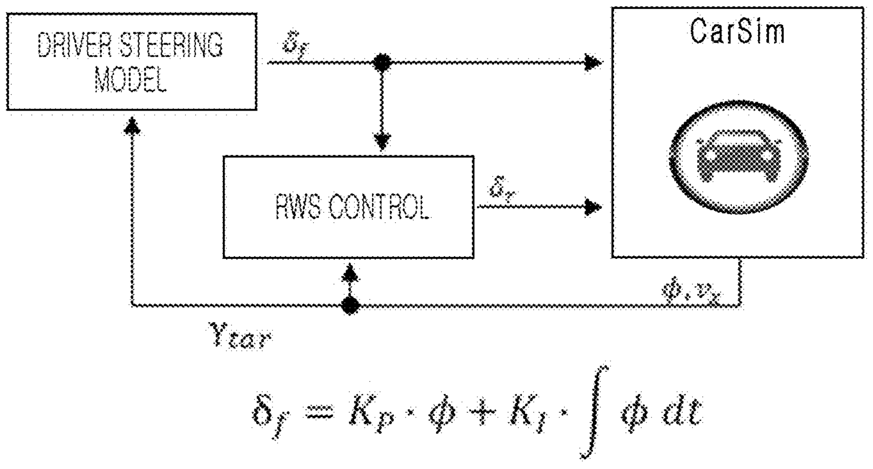
Figure 13B:
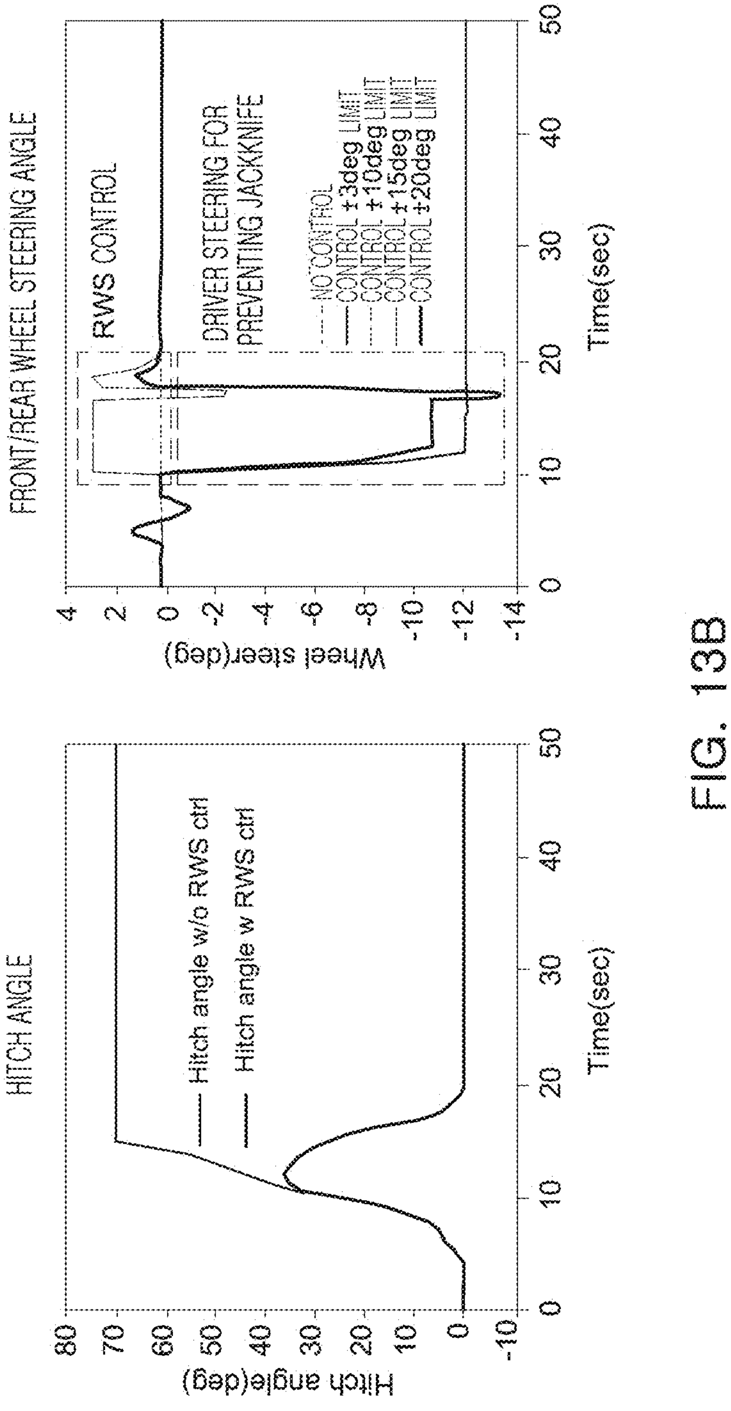

In the simulation, FIG. 13A illustrates a driver steering model implemented with a proportional integral (PI) controller so that the hitch angle value $\Phi$ is 0. In the simulation, FIG. 13B illustrates whether the hitch angle value $\Phi$ converges depending on whether rear wheel steering (RWS) control by the apparatus for controlling rear wheel steering of a vehicle according to an embodiment of the present disclosure is added to the driver steering model of FIG. 13A. FIG. 13B illustrates that the hitch angle value $\Phi$ does not converge with only the driver steering model without rear wheel steering (RWS) control and that the hitch angle value $\Phi$ converges by the combined use of rear wheel steering angle (RWS) control and the driver steering model. In other words, the apparatus for controlling rear wheel steering of a vehicle and the vehicle including the same according to an embodiment of the present disclosure may control rear wheel steering (RWS) to prevent a jackknife phenomenon and may also control the front-wheel steering angle according to design.

Referring to FIG. 2, the apparatus for controlling rear wheel steering of a vehicle according to an embodiment of the present disclosure may include the computing device 400 disposed in a vehicle (e.g., the tractor 100 and/or the trailer 200). The computing device 400 may include at least one processor 401, the computer-readable storage medium 402, or the communication bus 403. The communication bus 403 may interconnect various other components of the computing device 400 including the processor 401 and the computer-readable storage medium 402.

The processor 401 may enable the computing device 400 to operate according to the embodiments mentioned above. For example, the processor 401 may execute one or more programs stored in the computer-readable storage medium 402. The one or more programs may include one or more computer-executable instructions, which, when executed by the processor 401, may be configured to cause the computing device 400 to perform operations according to embodiments.

The computer-readable storage medium 402 may be configured to store computer-executable instructions or program code, program data, and/or other suitable forms of information. A program 402*a* stored in the computer-readable storage medium 402 may include a set of instructions executable by the processor 401. In an embodiment, the computer-readable storage medium 402 may include memory (volatile memory, such as random access memory, non-volatile memory, or appropriate combinations thereof), one or more magnetic disk storage devices, optical disk storage devices, flash memory devices, another form of storage medium that may be accessed by the computing device 400 and store desired information, or appropriate combinations thereof.

The computing device 400 may also include one or more input/output interfaces 405 providing interfaces for one or more input/output devices 404 and one or more network communication interfaces 406. The input/output interface 405 and the network communication interface 406 are connected to the communication bus 403. The network may be a cellular network, for example, one of global system for mobile communications (GSM), enhanced data rates for GSM evolution (EDGE), general packet radio service (GPRS), code division multiple access (CDMA), time division-CDMA (TD-CDMA), universal mobile telecommunications system (UMTS), long term evolution (LTE), 5G, Wi-Fi, or other cellular networks or may be implemented as Ethernet, media oriented systems transport (MOST), Flexray, controller area network (CAN), local interconnect network (LIN), Internet, Bluetooth, near field communication (NFC), Zigbee, radio frequency (RF), and the like.

The input/output device 404 may be coupled to other components of the computing device 400 through the input/output interface 405. For example, the input/output device 404 may include, but is not limited to, a pointing device (such as a mouse or trackpad), a keyboard, a touch input device (such as a touchpad or touch screen), a voice or sound input device, input devices, such as various types of sensor devices, and/or imaging devices, and/or output devices, such as a display device, a printer, a speaker, and/or a network card. For example, the input/output device 404 may be included within the computing device 400 as a component constituting the computing device 400 or may be connected to the computing device 400 as a separate device distinct from the computing device 400.

An embodiment of the present disclosure may include a program for performing the methods described in this specification on a computer and a computer-readable recording medium including the program. The computer-readable recording medium may include program instructions, local data files, local data structures, and the like, alone or in combination. The medium may be those specifically designed and configured for the present disclosure or may be those commonly available in the computer software field. Examples of computer-readable recording medium include magnetic medium, such as hard disks, floppy disks, and magnetic tapes, optical recording medium, such as CD-ROMS, and hardware devices specifically configured to store and perform program instructions, such as ROM, RAM, flash memory, and the like. Examples of the program may include not only machine language code, such as that generated by a compiler, but also high-level language code that may be executed by a computer using an interpreter or the like.

The apparatus for controlling rear wheel steering of a vehicle and the vehicle including the same according to an embodiment of the present disclosure may stably prevent a jackknife phenomenon. For example, the apparatus for controlling rear wheel steering of a vehicle and the vehicle including the same may improve jackknife prevention, while stably using the predetermined control logic of the RWS controller, which is configured by considering the tractor intensively.

While embodiments have been shown and described above, it should be apparent to those having ordinary skill in the art that modifications and variations could be made without departing from the scope of the present disclosure as defined by the appended claims.

What is claimed is:

1. An apparatus for controlling rear wheel steering of a vehicle including a tractor and a trailer connected to each other, the apparatus comprising:

a computing device including a processor and a storage medium on which one or more programs configured to be executable by the processor are recorded, wherein the one or more programs include instructions for executing an operation of selecting a target rear wheel steering angle based on:

a minimum hitch angle between the tractor and the trailer, the minimum hitch angle being an angle at or beyond which a hitch angle between the tractor and the trailer is unable to converge to 0; and a sensed hitch angle value between the tractor and the trailer.

2. The apparatus of claim 1, wherein:

the operation of selecting the target rear wheel steering angle includes an operation of calculating a weight based on the minimum hitch angle and the sensed hitch angle value; and the operation of selecting the target rear wheel steering angle includes selecting the target rear wheel steering angle based on a target yaw rate obtained by applying the weight to a jackknife prevention yaw rate based on the sensed hitch angle value.

3. The apparatus of claim 2, wherein the operation of calculating the weight includes calculating the weight increasing as a relative value of the sensed hitch angle value with respect to the minimum hitch angle increases.

4. The apparatus of claim 3, wherein:

in the operation of calculating the weight, the weight is calculated based on the minimum hitch angle $\Phi_{critical}$ in accordance with equation below $$\phi_{critical} = a\cos\left(\frac{-k_1k_2 \pm \sqrt{k_1^2 - k_2^2 + 1}}{(k_1^2 + 1)}\right); \text{ and}$$

where $k_1$ and $k_2$ are constants determined based on a controllable front wheel steering angle and a controllable rear wheel steering angle of the tractor, respectively.

5. The apparatus of claim 3, further comprising:

a rear wheel steering (RWS) controller configured to control rear wheels of the tractor according to a predetermined control logic or the target rear wheel steering angle, wherein the RWS controller is configured to control the rear wheels of the tractor by increasing a control proportion of the target rear wheel steering angle compared to the predetermined control logic as the weight increases.

6. The apparatus of claim 5, wherein:

the one or more programs further include instructions for executing an operation of determining whether the vehicle moves backwards (e.g., in reverse); and the RWS controller is configured to control the rear wheels of the tractor according to the predetermined control logic when the vehicle does not move backwards and to control the rear wheels of the tractor according to at least one of the target rear wheel steering angle or the predetermined control logic when the vehicle moves backwards.

7. The apparatus of claim 2, wherein:

the one or more programs further include instructions for executing an operation of determining whether the vehicle moves backwards; and the operation of selecting the target rear wheel steering angle includes selecting the target rear wheel steering angle when the vehicle moves backwards.

8. The apparatus of claim 7, wherein determining whether the vehicle moves backwards is based on a value sensed by a shift lever position sensor and a value sensed by a four-wheel speed sensor.

9. The apparatus of claim 7, wherein the operation of selecting the target rear wheel steering angle includes:

calculating the jackknife prevention yaw rate or the target yaw rate based on the sensed hitch angle value and a speed value of the tractor; and selecting the target rear wheel steering angle based on the target yaw rate, the speed value, and a front wheel steering angle value of the tractor.

10. The apparatus of claim 9, wherein the operation of selecting the target rear wheel steering angle includes:

calculating the jackknife prevention yaw rate or the target yaw rate using a length value of the trailer; and selecting the target rear wheel steering angle using the length value of the tractor.

11. The apparatus of claim 10, wherein:

in the operation of selecting the target rear wheel steering angle, the jackknife prevention yaw rate $\Gamma_{tar.jackknife}$ is selected according to equation below $$\gamma_{tar.jackknife} = \frac{v_x \sin(\phi - \delta_{r.pre}) + L_{h,trail} k\phi}{d_h \cos\phi + L_{h,trail}};$$

where $\Phi$ is the sensed hitch angle value, $v_x$ is the speed value of the tractor, $\delta_{r.pre}$ is a rear wheel steering angle value sensed by an RWS steering angle sensor, $k\Phi$ corresponds to a differential value of $\Phi$, $d_h$ and $I_{h,trail}$ are constants;

the target rear wheel steering angle $\delta_r$ is selected according to equation below $$\delta_r = a\tan\left(\tan\delta_f - \frac{l_f + l_r}{v_x}\gamma_{tar}\right); \text{ and}$$

where $l_f$+$l_r$ is a distance between front and rear wheels of the tractor, $v_x$ is the speed value of the tractor, $\delta_f$ is the front wheel steering angle value of the tractor, and $\Gamma_{tar}$ is the target yaw rate.

12. An apparatus for controlling rear wheel steering of a vehicle, the apparatus comprising:

a computing device including a processor and a storage medium on which one or more programs configured to be executable by the processor are recorded; and a rear wheel steering (RWS) controller configured to control rear wheels of a tractor of the vehicle including the tractor and a trailer connected to each other according to a predetermined control logic and a target rear wheel steering angle, wherein the one or more programs include instructions for executing an operation of selecting the target rear wheel steering angle based on a sensed hitch angle value between the tractor and the trailer, and wherein the RWS controller is configured to control the rear wheels of the tractor by increasing a control proportion of the target rear wheel steering angle compared to the predetermined control logic as the sensed hitch angle value increases.

13. The apparatus of claim 12 wherein the operation of selecting the target rear wheel steering angle includes:

an operation of calculating a target yaw rate based on the sensed hitch angle value and a speed value of the tractor; and an operation of selecting the target rear wheel steering angle based on the target yaw rate, the speed value, and a front wheel steering angle value of the tractor.

14. The apparatus of claim 13, wherein:

the one or more programs further include instructions for executing an operation of determining whether the vehicle moves backwards; and the operation of selecting the target rear wheel steering angle includes calculating the target yaw rate when the vehicle moves backwards or selecting the target rear wheel steering angle when the vehicle moves backwards.

15. The apparatus of claim 14, wherein the operation of determining whether the vehicle moves backwards is based on a value sensed by a shift lever position sensor and a value sensed by a four-wheel speed sensor.

16. The apparatus of claim 13, wherein the operation of selecting the target rear wheel steering angle includes:

calculating the target yaw rate using a length value of the trailer; and selecting the target rear wheel steering angle using a length value of the tractor.

17. The apparatus of claim 16, wherein:

in the operation of selecting the target rear wheel steering angle, the target rear wheel steering angle is selected according to equation below $$\delta_r = a\tan\left(\tan\delta_f - \frac{l_f + l_r}{v_x}\gamma_{tar}\right); \text{ and}$$

where $l_f$+$I_r$ is a distance between front and rear wheels of the tractor, $v_x$ is a speed value of the tractor, $\delta_f$ is the front wheel steering angle value of the tractor, and $\Gamma_{tar}$ corresponds to the target yaw rate.

18. A vehicle comprising the computing device of claim 1.

19. A vehicle comprising the computing device of claim 12.

* * * * *